(12) United States Patent
Augenstein et al.

(10) Patent No.: US 7,676,040 B2
(45) Date of Patent: Mar. 9, 2010

(54) CHANGING ENCRYPTION KEY OF ENCRYPTED DATA

(75) Inventors: Oliver Augenstein, Dettenhausen (DE); Jan Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 11/289,067

(22) Filed: Nov. 29, 2005

(65) Prior Publication Data

US 2006/0215839 A1    Sep. 28, 2006

(30) Foreign Application Priority Data

Dec. 22, 2004    (EP) .................................. 04106881

(51) Int. Cl.
*H04L 9/16*    (2006.01)
*H04L 9/28*    (2006.01)
*H04L 29/06*    (2006.01)
*H04L 9/18*    (2006.01)

(52) U.S. Cl. ........................ 380/277; 380/259; 713/153; 713/165

(58) Field of Classification Search ................. 380/259, 380/277; 713/153, 165
See application file for complete search history.

(56) References Cited

U.S. PATENT DOCUMENTS

| | | | |
|---|---|---|---|
| 4,746,788 A | | 5/1988 | Kawana |
| 5,940,507 A | * | 8/1999 | Cane et al. ................... 713/165 |
| 6,067,621 A | | 5/2000 | Chung et al. |
| 7,093,295 B1 | | 8/2006 | Saito |
| 2002/0016912 A1 | * | 2/2002 | Johnson ...................... 713/165 |
| 2002/0184488 A1 | * | 12/2002 | Amini et al. ................. 713/153 |
| 2003/0091191 A1 | | 5/2003 | Watanabe et al. |
| 2004/0256470 A1 | | 12/2004 | Takami et al. |

FOREIGN PATENT DOCUMENTS

| | | |
|---|---|---|
| DE | 3418571 | 11/1984 |
| EP | 1308885 B1 * | 1/2007 |
| WO | WO 99/63696 | 12/1999 |

OTHER PUBLICATIONS

Stallings, William. Cryptography and Network Security: Principles and Practices, Pearson Education, Inc. Aug. 2002, p. 43.*
Rubin, Paul. "Re: Re-encrypt and decrypt" (Web posting), Aug. 2004.*
Cooke, Jean-Luc. "Re: Re-encrypt and decrypt" (Web posting), Aug. 2004.*
Menezes, Alfred J. et al. Handbook of Applied Cryptography, 1997 CRC Press, p. 283.*
Menezes, Vanstone, Oorschot: "Handbook of Applied Cryptography" 1997, CRC Press LLC, USA, XP002407234, p. 21, p. 547-550.

* cited by examiner

*Primary Examiner*—Michael J Simitoski
(74) *Attorney, Agent, or Firm*—Garg Law Firm, PLLC; Rakesh Garg; Jeffrey S LaBaw

(57) ABSTRACT

A method, a system and a computer program for changing an encryption key of data encrypted by a first key and stored on an archive server (40), wherein a conversion is applied to the data, generating recrypted data decryptable by means of a second key, the conversion being generated on a second server (30) and associated with the first key and the second key via a functional operation and transferred from the second server (30) to the archive server (40) via a transfer channel (38).

14 Claims, 6 Drawing Sheets

CHANGING ENCRYPTION KEY OF ENCRYPTED DATA

FIELD OF THE INVENTION

The present invention relates to the field of handling data and, more particularly, to a method and a system for changing a data encryption key of data encrypted by a first key. The invention further relates to a computer program product with a computer-readable medium and a computer program stored on the computer-readable medium with program coding means which are suitable for carrying out such a method when the computer program is run on a computer.

DESCRIPTION OF THE RELATED ART

Encryption is a process of transforming information so it is unintelligible to anyone but the intended recipient. Decryption is the process of transforming encrypted information so that it is intelligible again. A cryptographic algorithm, also called a cipher, is a mathematical function used for encryption or decryption. In most cases, two related functions are employed, one for encryption and the other for decryption. The military is undoubtedly the largest user of encryption technology in today's world, but this is rapidly changing. Many individuals and companies are starting to use encryption to protect sensitive information of all types. From authors, to product designers, to personal e-mail, it seems everyone wants the privacy and security of encryption.

With most modern cryptography, the ability to keep encrypted information secret is based not on the cryptographic algorithm, which is widely known, but on a number called a key that must be used with the algorithm to produce an encrypted result or to decrypt previously encrypted information. Decryption with the correct key is simple. Decryption without the correct key should be very difficult, and at best impossible for all practical purposes.

Today encryption is used for multiple purposes: For instance it can be used to exchange sensitive data over an untrusted channel (for instance the internet) in a secure fashion or to protect access to sensitive data that is stored persistently on some type of storage media. While in the first case data is encrypted only temporarily the data remains encrypted for a longer period of time in the later case.

It can happen that data that is submitted across an untrusted channel is encrypted multiple times during data transfer. This happens—for example—if encrypted data is transferred across a secure internet connection. This type of encryption is known as superencryption. While in the previous example superencryption occurs by coincident without adding additional value (in the following this variant is denoted as "coincidental superencryption") there are a variety of applications that use the concepts of superencryption to provide additional value. For instance superencryption is used in some public-private-key encryption schemes to improve encryption performance. In such a scenario the (slow) public-private-key algorithm is used to exchange a random-generated symmetric key which is used as a seed for a (faster) symmetric-key-encryption algorithm that is then used to encrypt the data stream.

Another application of superencryption is to encrypt a set of encryption keys with some kind of "master password" in order to simplify the task of "remembering passwords". If—in such a scenario—a particular encryption key is needed the key is looked up in an encryption-key database which itself is encrypted with one master password.

With the exception of coincidental superencryption of data, all of the above superencryption schemes have in common that they do not encrypt encrypted data again. Further coincidental superencryption can be seen as an undesired side effect when an intermediate party is used to pass encrypted data through a channel that is encrypted separately.

Data archiving is a technique to perform a copy of some data stored on one storage medium to another storage medium, i.e. the archive server. Technically this operation is similar to performing a backup of some data. Unlike backups archives are kept for a long period of time for various reasons. For instance governmental rules require companies to keep e-mail and fiscal data for a long period of time. This period of time is typically much longer than the data is needed for the companies' daily business. Due to this archives are usually maintained physically and logically separate from productive data, i.e. typically a company has dedicated system administrators that administer archived data or store data archives at a server of an archive service provider.

Since data archives often contain sensitive data companies do not want their archive administrators having access to the data and thus frequently use encryption to prevent logical access to the data.

Due to the longevity of archived data it might happen that the encryption key used to encrypt the data becomes insecure. This happens for instance if a key-aware administrator of the production system resigns. In such situations it is desirable to change the encryption key of already archived data. This is a cumbersome task because it requires retrieving, decrypting, and re-archiving of archived data using a different encryption key, and deleting the previous archive. Transferring data for such a purpose can be very cost-intensive. Under certain circumstances the procedure described above is not possible because governmental regulations might require storing the archive through a method that makes it difficult or impossible to alter its content at a later point in time.

SUMMARY OF THE INVENTION

The present invention provides a method for changing a data encryption key of data encrypted by a first key and stored on a storage medium of an archive server, wherein a conversion is applied to the data within the archive server, generating "recrypted" data (i.e. encrypted data that is generated from already encrypted data) decryptable by means of a second key. The conversion is generated on a second server and associated with the first key and the second key via a functional operation and transferred from the second server to the archive server via a transfer channel.

With the invention, it is possible to achieve changing of an encryption key in a very cost- and time-saving way. Furthermore, the proposed method ensures that data are not readable during processing.

Furthermore the proposed method allows for changing the encryption key of encrypted data in such a way that it is impossible to alter the information represented by the encrypted data during the transformation operation.

The conversion can be realized by a specific conversion key.

Preferably, the conversion as for example the conversion key within the claimed method is to be chosen as not to be unambiguously restorable to said first and second key.

The conversion or the conversion key may be chosen as a symmetric key.

The first key and the second key can also be chosen as symmetric keys.

According to a possible embodiment of the method according to the present invention the first key and the second key each initialises generation of a data stream which is suitable to encrypt and decrypt data by means of an "exclusive-or"-operation, and the respective data streams of the first key and the second key are coupled by an "exclusive-or"-operation for generating the conversion.

It is possible that the first key initialises the generation of a data stream $\{(key)_1, \ldots, (key)_L\}$, the second key initialises the generation of a data stream $\{(hint)_1, \ldots, (hint)_L\}$ and the conversion is given by $\{(key)_1\hat{}(hint)_1, \ldots, (key)_L\hat{}(hint)_L\}$, wherein L is a given integer.

According to another embodiment of the method according to the present invention the first key is chosen as a pair of an encryption function e and an appropriate decryption function d and the second key is chosen as a pair of an encryption function e' and an appropriate decryption function d', the conversion x being generated by coupling the encryption function e' of the second key with the decryption function d of the first key as follows: $x = e' \odot d$.

According to another embodiment of the present invention, the method for changing an encryption key for data further comprises the following steps:
  generating and calculating the conversion from the first key and the second key on a safe second server,
  authorized transferring of the conversion via a secure transfer channel to the archive server, where the data encrypted by the first key are stored,
  applying the conversion to the data,
  storing such processed data in said archive server,
  transferring such processed data via a secure transfer channel to the safe server, when the data have to be retrieved.

Transferring of the conversion to the archive server should be done via a secure channel.

It is also possible that the first key and the second key are each chosen as a pair of a private key and an appropriate public key, the public and private keys are related in such a way that only the public keys can be used to encrypt data and only the corresponding private keys can be used to decrypt the data.

Public-key encryption, also called asymmetric encryption, involves a pair of keys—a public key and a private key—associated with an entity that needs to authenticate its identity electronically or to sign or to encrypt data. Each public key is published, and the corresponding private key is kept secret. Data encrypted with one's public key can be decrypted only with the private key related thereto. In general, to send encrypted data to someone, the data should be encrypted with that person's public key, and the person receiving the encrypted data decrypts it with the corresponding private key. The reverse scenario also works: data encrypted with one's private key can be decrypted only with the corresponding public key. This would not be desirable way to encrypt sensitive data, however, because it means that anyone with another one's public key, which is by definition published, could decrypt the data. Nevertheless, private-key encryption is useful, because it means, one can use a private key to sign data with one's own signature, which is an important requirement for electonic commerce and other commercial applications of cryptography. Client software such as Communicator can then use one's public key to confirm that the message was signed with the corresponding private key and that it hasn't been tampered with since being signed.

It is also conceivable to use a so-called superencryption. Superencryption is a process of encrypting encrypted data. The data, encrypted by a first key, which can be a symmetric key or a public key, is virtually encrypted twice using another key as the conversion key. The first key is also encrypted by said conversion key and archived together with said encrypted data on an appropriate server. A decryption would then be carried out within two steps. First, the first key is decrypted and afterwards the data are decrypted successively by means of both keys, namely the conversion key and the first key, respectively.

It is possible that a key can consist of several "elementary" keys, each of which being a key of a symmetric encryption scheme, i.e. key=$(key_1, key_2, \ldots, key_n)$. During decryption according to the prior art an encrypted data stream is then decrypted first using $key_n$, then using $key_{n-1}, \ldots$, and finally using $key_1$. According to the present invention the conversion key, called ckey is then chosen as an arbitrary elementary key and the new decryption key, namely the second key corresponds then to key'=$(key_1, \ldots, key_n, ckey)$.

This proposed algorithm can be applied for public-private schemes as well. If a key consists of several elementary public keys, i.e. key=$(publ_1, publ_2, \ldots, publ_n)$ which are used for encryption and corresponding private keys for decryption, then ckey is an elementary arbitrary public key $publ_{ckey}$ with corresponding private key $priv_{ckey}$ and the new decryption key, namely the second key corresponds then to key'= $(priv_1, \ldots, priv_n, priv_{ckey})$.

Furthermore, it is possible to use an algorithm with at most one decryption step. This can be a cryptographic cipher having the following property: if data is encrypted with $e_k$ and decrypted with $d_k$, then for each pair of keys k, k' there exists a key, which is easy to calculate, m=f(k,k'), such that $d_m = d_k \circ d_{k'}$. Then for data encrypted with key k the conversion key is chosen as an arbitrary other key c and the conversion (recryption) operation is to superencrypt the encrypted data using key c. Decryption of the thus superencrypted data corresponds to the one-step decryption using as second key the key k'=f(k, c). If in this scenario the conversion operation is performed multiple times with different keys the decryption still consists of a single step.

In another possible embodiment of the claimed method, the first key k and the conversion key c are both to be chosen as symmetric keys of the same length as the data D and the second key is to be calculated from both of the symmetric keys as f(k, c). This can be chosen as follows: D is the data of length L and k as the first key is a key of length L. D is encrypted using the "exclusive or" operation with k: $E = k\hat{}D$. E is then the encrypted data. Decryption is performed with the same operation, i.e. with $D = k\hat{}E = k\hat{}k\hat{}D$. Recryption is performed using the "exclusive or" operation with a new arbitrary choosen key c of length L, i.e. the recrypted data is $R = c\hat{}E$. The decryption key, namely the second key k' associated with the recrypted data is k'=f(k, c)=$k\hat{}c$, because $D = (k\hat{}c)\hat{}R = (k\hat{}c)\hat{}c\hat{}E = k\hat{}c\hat{}c\hat{}E = k\hat{}E = k\hat{}k\hat{}D = D$.

Alternatively, in another possible embodiment of the claimed method, the first key k and the second key k' are both to be chosen as symmetric keys of the same length as the data D and a conversion key c is to be calculated from both of the symmetric keys as c=f(k, k')=$k\hat{}k'$. This can be chosen as follows: D is the data of length L and k as the first key is a key of length L. D is encrypted using the "exclusive or" operation with k: $E = k\hat{}D$. E is then the encrypted data. Decryption is performed with the same operation, i.e. with $D = k\hat{}E = k\hat{}k\hat{}D$. Recryption is performed using the "exclusive or" operation with the conversion key c=f(k, k') of length L, i.e. the recrypted data is $R = c\hat{}E$. Decryption associated with the recrypted data has then been made with help of the second key k', namely $k'\hat{}R = k'\hat{}(c\hat{}E) = k'\hat{}((k\hat{}k')\hat{}E) = k'\hat{}k\hat{}k'\hat{}k\hat{}D = (k'k')\hat{}(k\hat{}k)\hat{}D = D$, because the "exclusive or" operation is a commutative operation.

In another possible embodiment of the claimed method, the first key K and the second key K' are used to initialize a pseudo-random numbers generator, which produce streams of pseudo-random numbers k and k'. These pseudo-random numbers can be used to encrypt a stream of data D using the "exclusive or" operation as described in the previous embodiment of the claimed method. The conversion key c is then the stream of numbers obtained by "exclusive or"ing k and k'.

Symmetric-key encryption can be used alternatively for encrypting data. With symmetric-key encryption, the encryption key can be calculated from the decryption key and vice versa. With most symmetric algorithms, the same key is used for both encryption and decryption. Implementations of symmetric-key encryption can be highly efficient, so that users do not experience any significant time delay as a result of the encryption and decryption. Symmetric-key encryption also provides a degree of authentication, since information encrypted with one symmetric key cannot be decrypted with any other symmetric key. Thus, as long as the symmetric key is kept secret by the two parties using it to encrypt communications, each party can be sure that it is communicating with the other as long as the decrypted messages continue to make sense. Symmetric-key encryption is effective only if the symmetric key is kept secret by the two parties involved. If anyone else discovers the key, it affects both confidentiality and authentication. A person with an unauthorized symmetric key not only can decrypt messages sent with that key, but can encrypt new messages and send them as if they came from one of the two parties who were originally using the key. Therefore, when using symmetric-key encryption, the conversion key as a symmetric key has to be transferred over a secure channel, as for example over a so-called secure socket layer (SSL).

Furthermore, the invention covers a computer program product according to claim 8 and a computer program with the features of claim 9.

According to claim 8, a computer program product with a computer-readable medium and a computer program stored on said computer-readable medium with a program code is provided which is suitable for carrying out the claimed method as described before when said computer program is run on a computer.

The invention further provides a computer program with a program code which is suitable for carrying out a claimed method when said computer program is run on a computer.

The invention also covers a system for changing a data encryption key of data stored on a storage medium of an archive server and encrypted by a first key using a method according to the present invention and comprising at least the following elements:
- a generating unit on a second server for generating a conversion which is associated with the first key and a second key via a functional operation,
- a transferring unit and a transfer channel for transferring said conversion from said second server via the transfer channel to said archive server,
- an encrypting unit on said archive server for applying said conversion to said data stored on the storage medium of said archive server, and
- a transferring unit and a transfer channel for transferring such processed data via the transfer channel to said second server.

According to a possible embodiment of the system according to the present invention, the system further comprises at least one generator for generating data streams, which are suitable to encrypt and decrypt data by means of an "exclusive-or"-operation, the generator can be initialised by the first key or by the second key or by the first key and the second key.

The conversion can be realized by a conversion key.

The present invention discloses a transfer of a new key, namely a conversion key, from a second server with a safe storage medium to an archive server with an unsafe storage medium in order to apply this new key to the encrypted data stored thereon so that the modified data can be decrypted using the next decryption key, namely the second key.

In the present invention the conversion key can degenerate to a stream of conversion data that is consumed in the encrypting unit on the archive server, which can be a server with an unsafe storage medium. In this case the present invention discloses a communication mechanism in the encrypting unit that informs the generating unit on the second server when to terminate the conversion stream.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

The invention is schematically illustrated in the drawings by way of example and is hereinafter explained in detail with reference to the drawings. It is understood that the description is in no way limiting on the scope of the present invention and is merely an illustration of a preferred embodiment of the invention.

DETAILED DESCRIPTION OF THE DRAWINGS

Other aspects and advantages of the invention will become apparent upon review of the detailed description and upon reference of the drawings in which.

DETAILED DESCRIPTION

Figure 1:
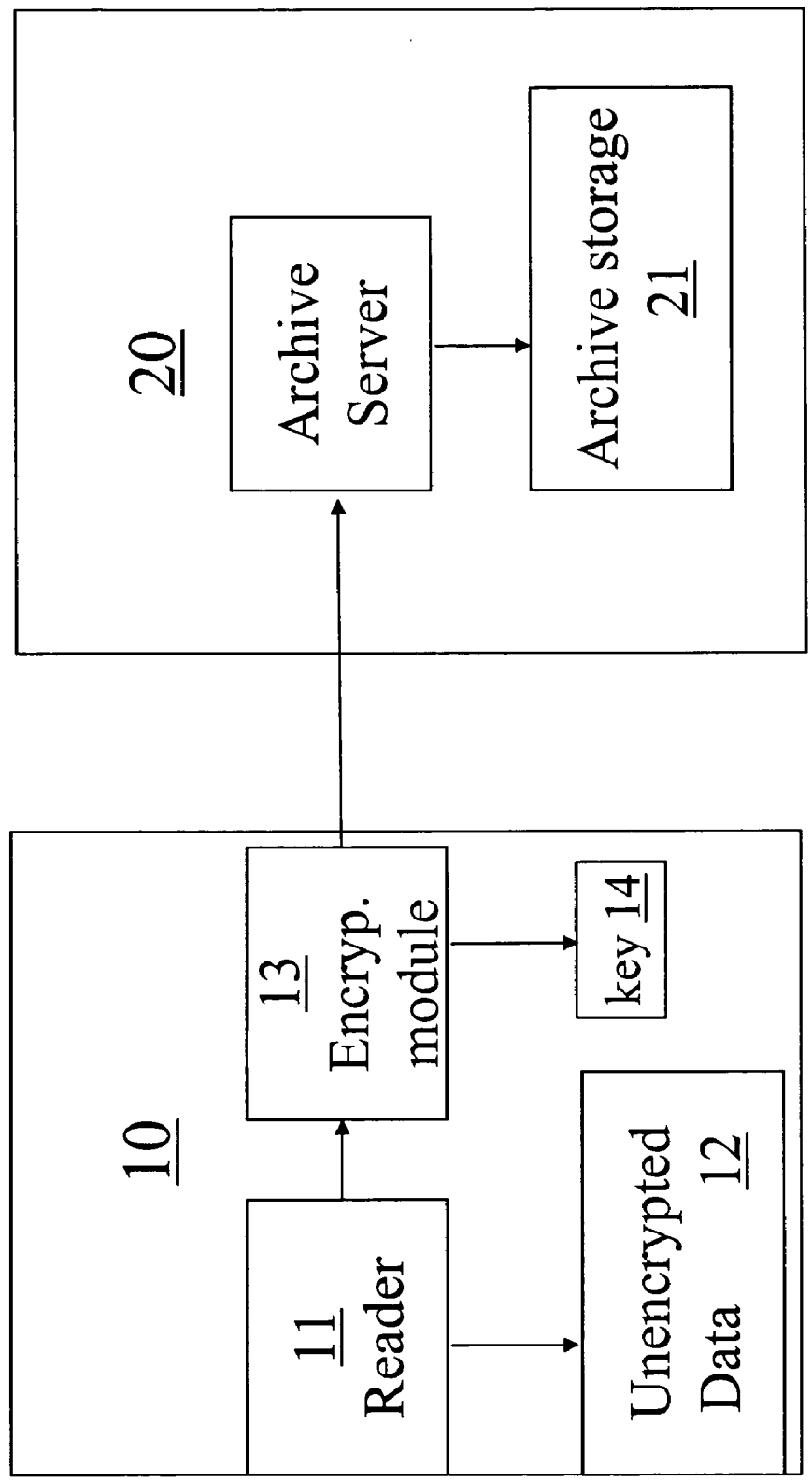
FIG. 1 shows an encryption-capable archiving system according to the prior art.

FIG. 1 shows a conventional encryption-capable archiving system consisting of an archive client 10 and an archive server 20. The archive client 10 has access to unencrypted data stored within a client storage medium 12 that is to be archived. A reader 11 reads the unencrypted data stored in the client storage medium 12 and submits it to an encryption module 13 that is encrypting the data received using an encryption key 14. The encrypted data is then submitted to the archive server 20 where it is written (in encrypted form) to an archive storage medium 21. Data hosted on the archive server 20 is protected from logical access by hiding the encryption key 14 from the archive server 20.

If data is to be retrieved from the archive server 20 the encryption key 14 has to be known. During data retrieval the encryption module 13 requests data from the archive server 20 which reads the (encrypted) data from archive storage 21. The encryption module 13 is then decrypting the data using the provided encryption key 14. The reader 11 is then extracting the unencrypted data from the encryption module 13 and writes it to the clients storage medium 12.

Note that in a conventional system the archive server 20 is not aware that it is storing encrypted data.

The invention permits users to change the encryption key of data encrypted by a first key without need of decryption achieving a lasting secure encryption of said data.

Figure 2:
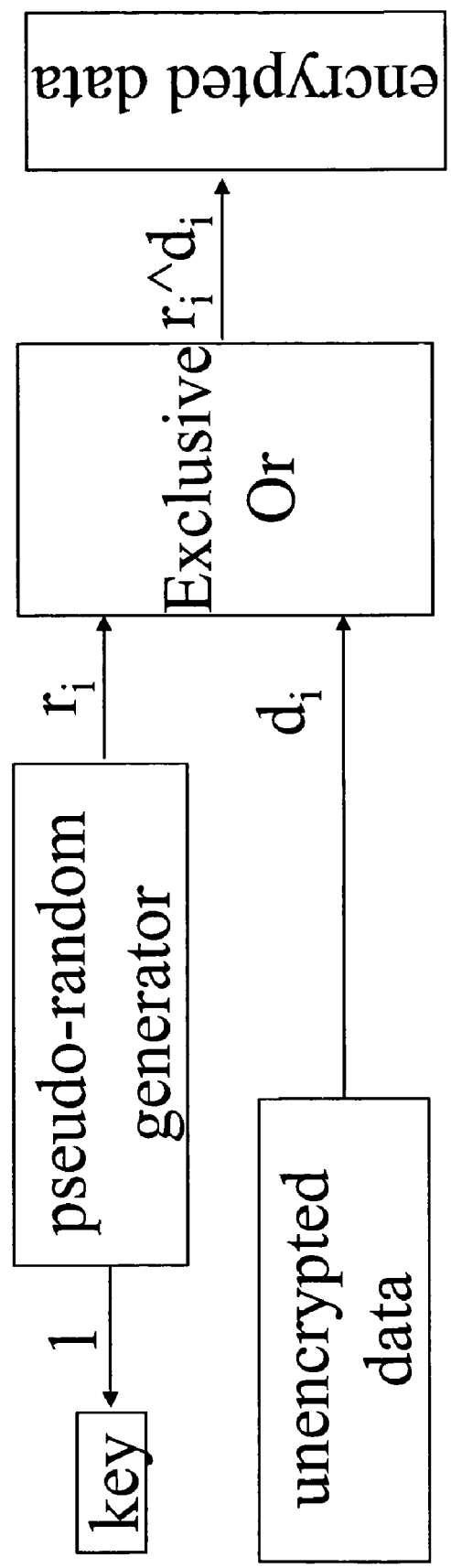
FIG. 2 shows a category of symmetric key encryption schemes known according to the prior art that can be used in the present invention.

FIG. 2 shows a conventional symmetric key encryption scheme according to the prior art that is an example of the encryption module described in FIG. 1. A pseudo-random generator is initialized with a key (1). A module reading a stream $\{d_1, d_2, \ldots, d_i, \ldots, d_L\}$ of unencrypted data of length L can request a stream of pseudo-random numbers $\{r_1, r_2, \ldots, r_i, \ldots, r_L\}$ from the key-initialized pseudo-random generator to generate a stream of encrypted data $\{r_1\hat{}d_1, r_2\hat{}d_2, \ldots, r_i\hat{}d_i, \ldots, r_L\hat{}d_L\}$, where $r_i\hat{}d_i$ is the value obtained by means of an "exclusive or" operation of $r_i$ with $d_i$. If the—in the above described fashion—encrypted data is encrypted with the same key for a second time the resulting data is identical to the unencrypted data. Thus the decryption operation is identical to the above described procedure.

Figure 3:
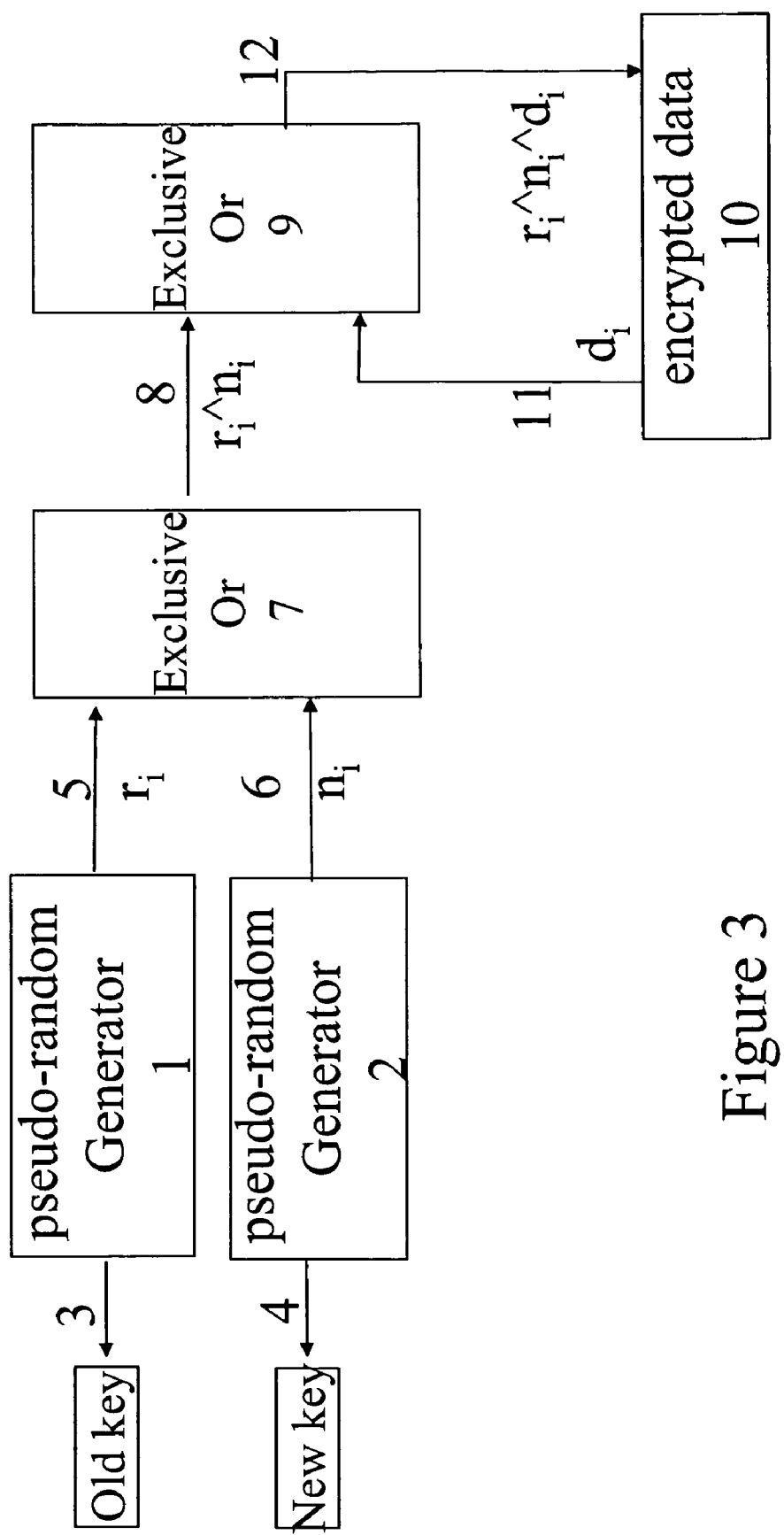
FIG. 3 shows sequence flows illustrating related procedures according to a possible embodiment of the present invention.

FIG. 3 shows how to modify data encrypted with an "old key", namely a first key, such that the modified encrypted (recrypted) data is effectively encrypted with a "new key". The herein described recryption algorithm is possible for any encryption algorithm that can be described with FIG. 2. In FIG. 3 two pseudo-random generators 1 and 2 create pseudo-random numbers using an identical pseudo-random number algorithm. Pseudo-random generator 1 is initialized (3) with "old key" which corresponds to the key with which the data is currently encrypted. Pseudo-random generator 2 is initialized (4) with "new key" which is an arbitrary valid key. The thus initialized pseudo-random generators create two streams of random numbers (5 and 6). The numbers created in these streams are merged into a single stream 8 using an "exclusive or" operation 7. This stream 8 is merged with an "exclusive or" operation 9 with a stream of encrypted data 11 that is generated by sequentially reading encrypted data 10. The elements of a resulting stream 12 corresponding to a stream of recrypted data are then used to replace the previously read encrypted data 10.

Figure 4:
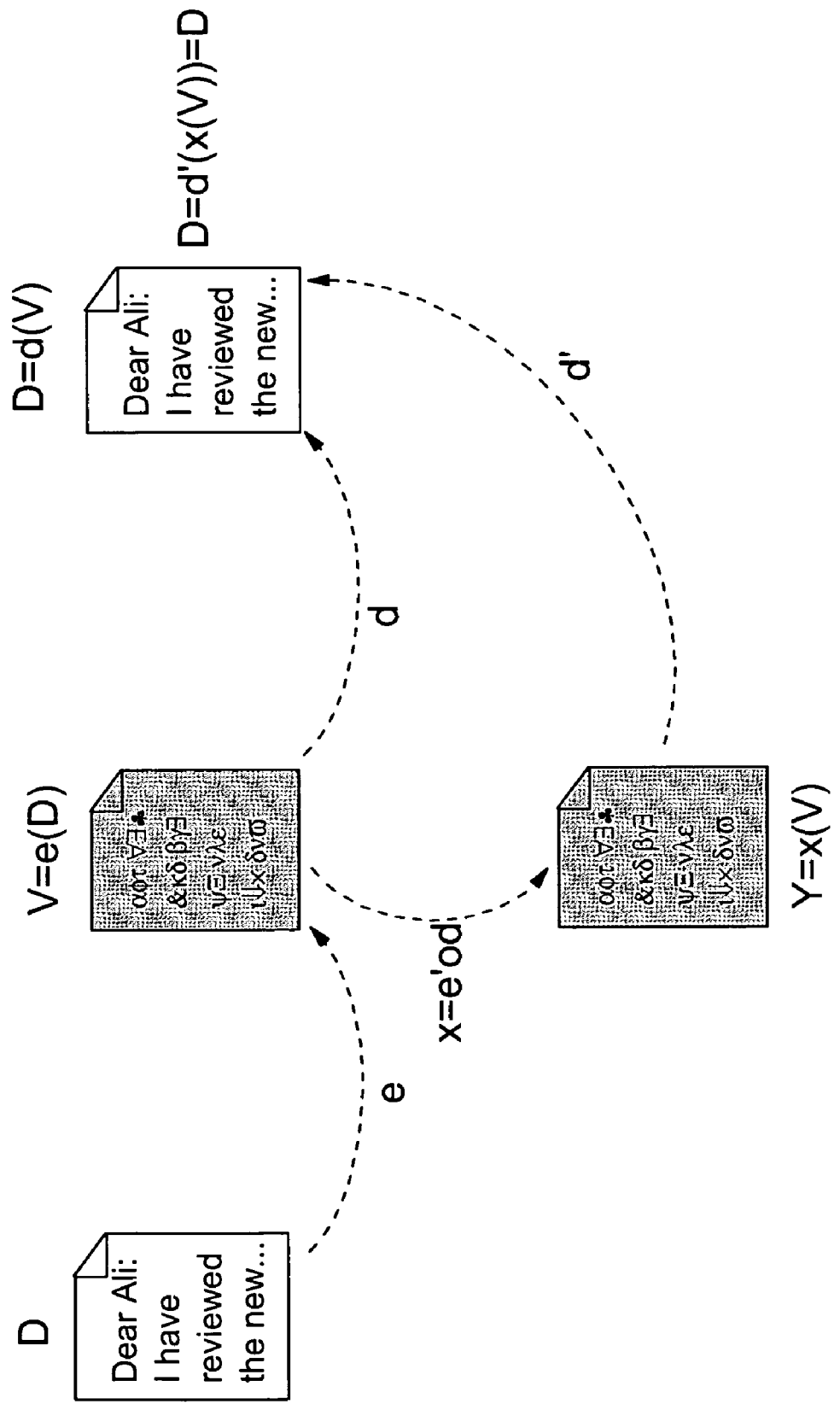
FIG. 4 shows sequence flows illustrating related procedures according to another embodiment of the present invention.

FIG. 4 shows a general method for changing an encryption key. The encryption function is called e, so that the encrypted data are V=e(D), whereas d is the decryption function so that D=d(V). That means D=d(e(D)) and so e is therefore the inverse function of d and vice versa.

e' and d' are the new encryption and decryption functions, respectively. The conversion function is given by x=e'⊙d, because with Y=e'(d(V)), it applies that Y=e'(d(e(D)))=e'(D) and therefore D=d'(Y)=d'(e'(D)).

Figure 5:
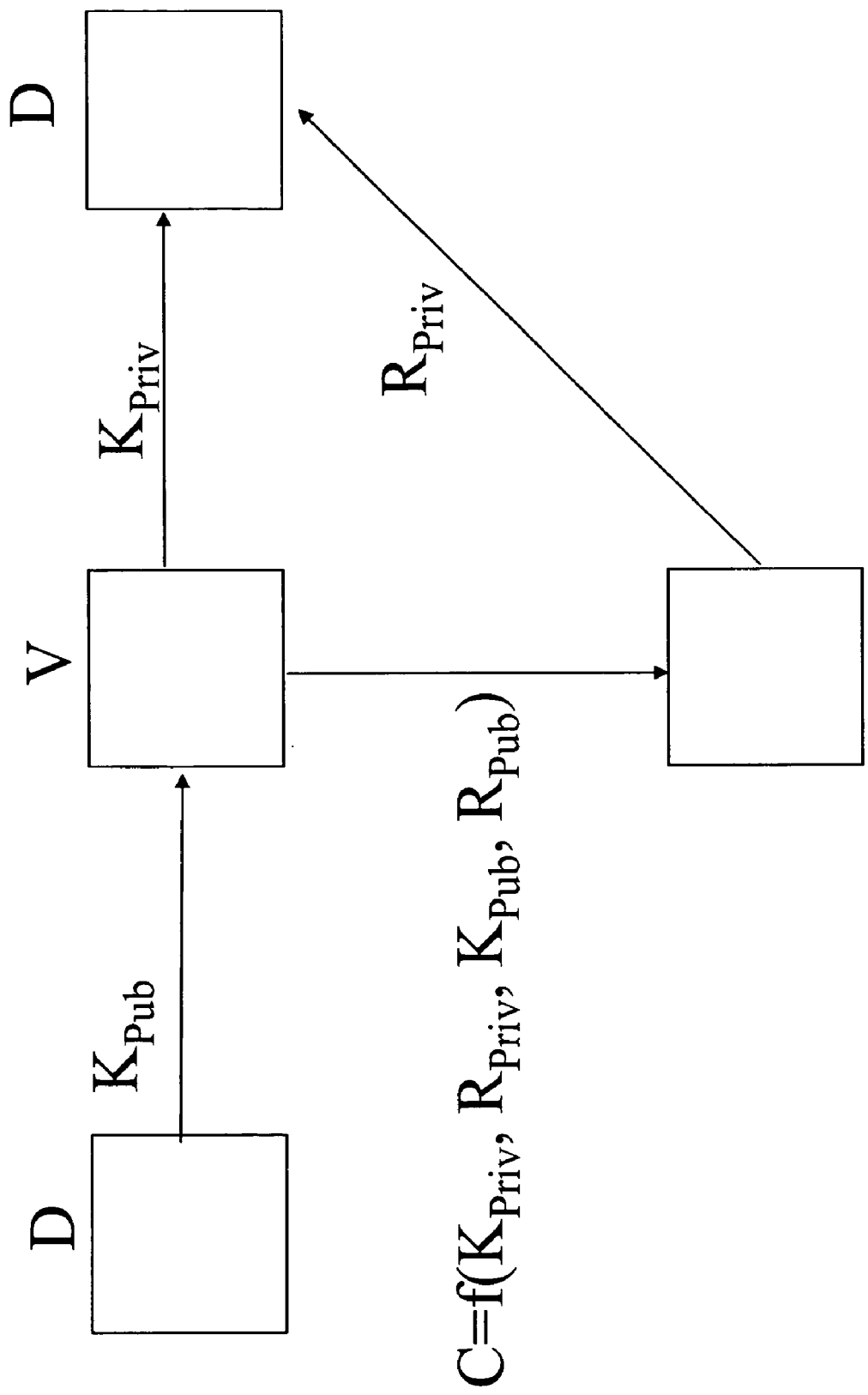
FIG. 5 shows sequence flows illustrating related procedures according to a further embodiment of the present invention.

Referring to FIG. 5, illustrating a further method for changing the encryption key. This procedure is performed as an asymmetric encryption method, namely a public-key encryption.

An important element to the applied public key system is that the public and private keys are related in such a way that only the public key can be used to encrypt data and only the corresponding private key can be used to decrypt them. Each public key is published and the corresponding private key is kept secret. The data D are encrypted by means of a public key $K_{Pub}$ so that they can be decrypted only by means of the corresponding private key $K_{Priv}$. The private key $K_{Priv}$ remains in a safe storage medium while the encrypted data V are stored on an unsafe storage medium.

On the safe storage medium, a new set of keys $R_{Priv}$, $R_{Pub}$ is created and a conversion key C is calculated from the old and new public and private keys. The conversion key C is submitted to the unsafe storage medium and used to recrypt the encrypted data in such a way that decryption can be achieved using $R_{Priv}$.

According to prior art there are asymmetric encryption algorithms having the desired properties, i.e. ElGamal and Cramer-Shoup encryption.

Figure 6:
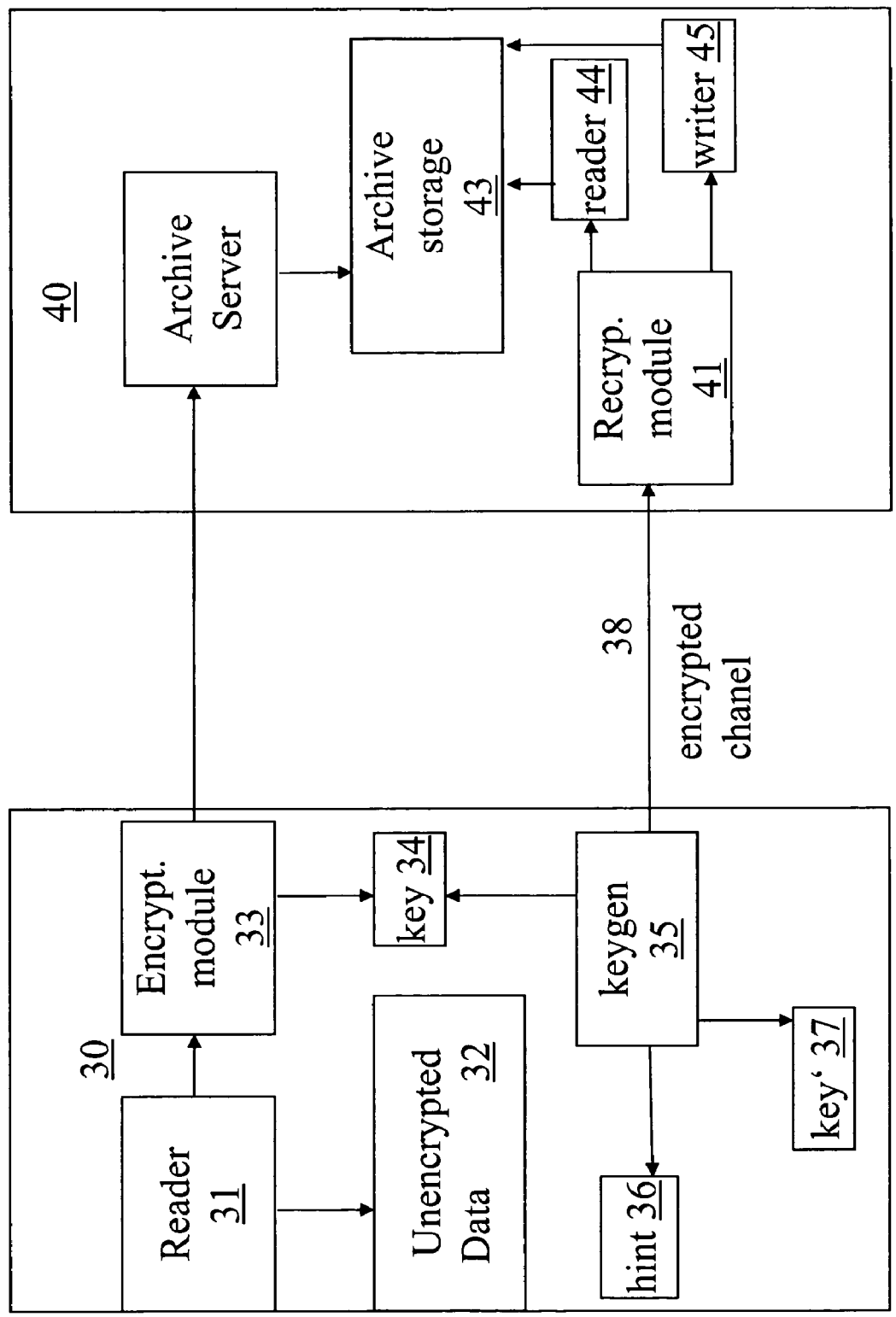
FIG. 6 shows a block diagram of still another possible embodiment of the present invention.

FIG. 6 shows a further encryption-capable system consisting of an archive client 30 and an archive server 40. The archive client 30 has access to unencrypted data 32 that is to be archived. A reader 31 reads the unencrypted data 32 that is then submitted to an encryption module 33. The encryption module 33 is then encrypting the data 32 by using an encryption key 34. The encrypted data is then submitted to the archive server 40 that writes the encrypted data to an archive storage 43. A component 35 within the archive client 30, called "keygen", uses the key 34 and a hint 36 to create a new key, namely key' 37, and a stream of conversion information that is sent via an encrypted channel 38 to a recrypted module 41. The recryption module 41 uses a reader 44 to read the encrypted data from the archive storage 43 in form of a data stream. Using the data received from the encrypted channel 38 the recryption module 41 converts the data received from the reader 44 into a converted data stream that is written back to archive storage 43 via the writer 45.

During this operation the previously stored archive data has to be deleted and replaced with the new recrypted data.

Restoring the data works with an algorithm according to the prior art using the recrypted data and key' 37 instead of key 34.

It has to be noted that the recryption steps can be applied multiple times before an archive is retrieved.

The reader 44 on the archive server 40 can be implemented such that data is deleted on the fly and the writer 45 of the archive server 40 can be implemented such that it reuses storage that corresponds data segments that are read already. The advantage of such an approach is that recryption does not require a significant amount of additional storage.

It has to be noted that the number of digits of the conversion data stream that are sent via the encrypted channel 38 might depend on some or all of the parameters key 34, hint 36, and the encrypted data stored on archive storage 43. Depending on the concrete choice of the algorithm it might thus be necessary that the recryption module 41 and keygen 35 have to negotiate length of the conversion data stream that is sent over the encrypted channel 38.

FIG. 2 and FIG. 3 show a possible scenario.

The second key is chosen to be key'=hint. The first key initializes a generator for generating a data stream $\{(key)_1, \ldots (key)_L\}$ and the second key initializes a further generator for generating a corresponding data stream $\{(hint)_1, \ldots (hint)_L\}$. The conversion data stream is a sequence of pseudo-random numbers, i.e. $\{(key)_1\hat{}(hint)_1, \ldots, (key)_L\hat{}(hint)_L\}$. In this case the recryption module 41 informs the keygen 35 if all of the previously encrypted data is recrypted. This event is fired as soon as the reader 44 has read all data.

In this scenario the stream of the recrypted-key has the same size as the encrypted data. Nevertheless the performance benefit is still there, because there is no need to transfer the encrypted data back to the archive client 30 and there is no need to provide sufficient storage for the archive data in the archive client 30. In addition the recryption operation does not enable a user to manipulate the content of the archived data. Thus this recryption operation can be applied for data that—due to governmental regulations—has to be stored on write protected media.

What we claim is:

1. A method for changing a data encryption key of data encrypted by a first key and stored on a storage medium of an archive server, the method comprising:
   receiving by an authorized transfer via a secure transfer channel, at the archive server where the data encrypted by the first key are stored, of a conversion generated and calculated from the first key and a second key on a safe server, the conversion being associated with the first key and the second key via a functional operation;
   applying the conversion to the data within the archive server without decrypting the data thereby generating recrypted data decryptable by means of the second key;
   storing the recrypted data in the archive server; and
   transferring from the archive server to the safe server, the recrypted data via the secure transfer channel when the data has to be retrieved.

2. The method according to claim 1, wherein the first key and the second key are each chosen as a symmetric key.

3. The method according to claim 2, wherein the first key initialises the generation of a first data stream $\{(key)_1, \ldots, (key)_L\}$, the second key initialises the generation of a second data stream $\{(hint)_1, \ldots, (hint)_L\}$ and the conversion is given by $\{(key)_1\hat{\ }(hint)_1, \ldots, (key)_L\hat{\ }(hint)_L\}$, wherein L is a given integer, and wherein symbol "^" is an exclusive-or operation.

4. The method according to claim 1, wherein the first key and the second key each initialises generation of a data stream which is suitable to encrypt and decrypt data by means of an "exclusive-or"-operation, and wherein the respective data streams of the first key and the second key are coupled by an "exclusive-or"-operation for generating the conversion.

5. The method according to claim 1, wherein the first key is chosen as a pair of an encryption function e and an appropriate decryption function d and the second key is chosen as a pair of an encryption function e' and an appropriate decryption function d', the conversion x being generated by coupling the encryption function e' of the second key with the decryption function d of the first key as follows: $x = e' \bigcirc d$, wherein "$\bigcirc$" represents an order of application of functions such that e' is applied after d.

6. The method according to claim 1, wherein the first key and the second key are each chosen as a pair of a private key $(K_{Priv}, R_{Priv})$ and an appropriate public key $(K_{Pub}, R_{Pub})$, wherein the public and private keys are related in such a way that only the public keys $(K_{Pub}, R_{Pub})$ can be used to encrypt data and only the corresponding private keys $(K_{Priv}, R_{Priv})$ can be used to decrypt the data.

7. A computer program product in a computer-readable medium for carrying out a method when said computer program is run on a computer, the method comprising:
   receiving by an authorized transfer via a secure transfer channel, at the archive server where the data encrypted by the first key are stored, of a conversion generated and calculated from the first key and a second key on a safe server, the conversion being associated with the first key and the second key via a functional operation;
   applying the conversion to the data within the archive server without decrypting the data thereby generating recrypted data decryptable by means of the second key;
   storing the recrypted data in the archive server; and
   transferring from the archive server to the safe server, the recrypted data via the secure transfer channel when the data has to be retrieved.

8. The computer program product according to claim 7, wherein the first key and the second key are each chosen as a symmetric key.

9. The computer program product according to claim 8, wherein the first key initialises the generation of a first data stream $\{(key)_1, \ldots, (key)_L\}$, the second key initialises the generation of a second data stream $\{(hint)_1, \ldots, (hint)_L\}$ and the conversion is given by $\{(key)_1\hat{\ }(hint)_1, \ldots, (key)_L\hat{\ }(hint)_L\}$, wherein L is a given integer, and wherein symbol "^" is an exclusive-or operation.

10. The computer program product according to claim 7, wherein the first key and the second key each initialises generation of a data stream which is suitable to encrypt and decrypt data by means of an "exclusive-or"-operation, and wherein the respective data streams of the first key and the second key are coupled by an "exclusive-or"-operation for generating the conversion.

11. The computer program product according to claim 7, wherein the first key is chosen as a pair of an encryption function e and an appropriate decryption function d and the second key is chosen as a pair of an encryption function e' and an appropriate decryption function d', the conversion x being generated by coupling the encryption function e' of the second key with the decryption function d of the first key as follows: $x = e' \bigcirc d$, wherein "$\bigcirc$" represents an order of application of functions such that e' is applied after d.

12. The computer program product according to claim 7, wherein the first key and the second key are each chosen as a pair of a private key $(K_{Priv}, R_{Priv})$ and an appropriate public key $(K_{Pub}, R_{Pub})$, wherein the public and private keys are related in such a way that only the public keys $(K_{Pub}, R_{Pub})$ can be used to encrypt data and only the corresponding private keys $(K_{Priv}, R_{Priv})$ can be used to decrypt the data.

13. A system for changing a data encryption key of data stored on a storage medium of an archive server and encrypted by a first key using a method comprising:
   a transferring unit and a secure transfer channel for receiving by an authorized transfer, at the archive server where the data encrypted by the first key are stored, of a conversion generated and calculated from the first key and a second key on a safe server, the conversion being associated with the first key and the second key via a functional operation;
   computer usable code for applying the conversion to the data within the archive server without decrypting the data thereby generating recrypted data decryptable by means of the second key;
   a storage medium for storing the recrypted data in the archive server; and
   transferring from the archive server to the safe server, the recrypted data via the secure transfer channel when the data has to be retrieved.

14. A system according to claim 13, further comprising:
   at least one generator for generating data streams, which are suitable to encrypt and decrypt data by means of an "exclusive-or"-operation, the generator can be initialised by the first key or by the second key or by the first key and the second key.

* * * * *